US011554524B2

(12) United States Patent
Kitagawa et al.

(10) Patent No.: US 11,554,524 B2
(45) Date of Patent: Jan. 17, 2023

(54) METHOD FOR MANUFACTURING SUPPORTING BODY

(71) Applicant: NITTO DENKO CORPORATION, Ibaraki (JP)

(72) Inventors: Daisuke Kitagawa, Ibaraki (JP); Youzou Yano, Ibaraki (JP); Satoshi Nishiyama, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 258 days.

(21) Appl. No.: 16/770,162

(22) PCT Filed: Dec. 4, 2018

(86) PCT No.: PCT/JP2018/044531
§ 371 (c)(1),
(2) Date: Jun. 5, 2020

(87) PCT Pub. No.: WO2019/111881
PCT Pub. Date: Jun. 13, 2019

(65) Prior Publication Data
US 2020/0384673 A1 Dec. 10, 2020

(30) Foreign Application Priority Data
Dec. 7, 2017 (JP) .............................. JP2017-235446

(51) Int. Cl.
*B29C 45/27* (2006.01)
*B29C 45/00* (2006.01)
(Continued)

(52) U.S. Cl.
CPC ...... *B29C 45/2708* (2013.01); *B29C 45/0025* (2013.01); *B29C 45/0046* (2013.01);
(Continued)

(58) Field of Classification Search
CPC ........ B29C 2045/0049; F21S 45/30–37; F21V 31/03
See application file for complete search history.

(56) References Cited

U.S. PATENT DOCUMENTS

| 6,364,924 B1 | 4/2002 | Mashiko et al. |
| 2012/0174789 A1 | 7/2012 | Ono et al. |
| 2015/0062940 A1 | 3/2015 | Scagliarini |

FOREIGN PATENT DOCUMENTS

| GB | 2538051 A | * 11/2016 | ......... B29C 45/0046 |
| JP | 2001-143524 A | 5/2001 | |

(Continued)

OTHER PUBLICATIONS

Feb. 26, 2019 International Search Report issued in International Patent Application No. PCT/JP2018/044531.

*Primary Examiner* — Xiao S Zhao
*Assistant Examiner* — John J DeRusso
(74) *Attorney, Agent, or Firm* — Oliff PLC

(57) ABSTRACT

A method of manufacturing a support member, which includes a tubular-shaped tubular part and a coupling part coupling one portion and another portion of an inner circumferential surface of the tubular part to support a ventilation membrane, includes filling a fixed mold and a movable mold with a thermoplastic material or a thermosetting material, wherein the thermoplastic material or the thermosetting material is injected from a gate in the coupling part to be charged from the coupling part toward the cylindrical part.

8 Claims, 5 Drawing Sheets

(51) Int. Cl.
*F21V 31/03* (2006.01)
*B29C 45/14* (2006.01)
F21Y 115/10 (2016.01)
F21S 45/30 (2018.01)
B29L 31/30 (2006.01)

(52) U.S. Cl.
CPC ........ *B29C 45/14795* (2013.01); *F21V 31/03* (2013.01); *B29C 2045/0027* (2013.01); *B29L 2031/30* (2013.01); *F21S 45/30* (2018.01); *F21Y 2115/10* (2016.08)

(56) References Cited

FOREIGN PATENT DOCUMENTS

| | | | |
|---|---|---|---|
| JP | 2011-023206 A | 2/2011 | |
| JP | 2015-515105 A | 5/2015 | |
| JP | 2017-204620 A | 11/2017 | |
| WO | WO-2005077767 A1 * | 8/2005 | ............... B65D 1/10 |

* cited by examiner

| | EXPERIMENTAL MEMBER | COMPARATIVE EXPERIMENTAL MEMBER |
|---|---|---|
| 0hr |  |  |
| 100hr | ○ | ○ |
| 200hr | ○<br> | ×<br> |

METHOD FOR MANUFACTURING SUPPORTING BODY

TECHNICAL FIELD

The present invention relates to a method for manufacturing a supporting body.

BACKGROUND ART

Conventionally, devices including vehicle lamps, such as head lamps, rear lamps, fog lamps and turn lamps, an inverter, a converter, an ECU (Electronic Control Unit) a battery box and the like require ventilating properties eliminating a differential pressure generated inside a housing due to temperature change. In addition, these devices require dust-proofing properties preventing foreign materials from entering inside a housing, water-resisting properties preventing entry of water, oil repellent properties preventing entry of oil and CCT tolerance preventing entry of salt. Therefore, a ventilation member provided with functions of the ventilating properties, the dust-proofing properties, the water-resisting properties, the oil repellent properties and the CCT tolerance is attached to each device.

For example, in a ventilation cap (ventilation member) described in Patent Document 1, into a cover part of substantially a bottomed cylindrical shape, a substantial tubular body having substantially a cylindrical shape is fittingly inserted, and, between the inner circumference of the cover part and the outer circumference of the substantial tubular body and between a bottom surface of the cover part and a bottom portion of the substantial tubular body is formed into a ventilation path, and a top opening part of the substantial tubular body is formed in an attachment part for attaching to an attachment opening of an device housing. The ventilation cap (ventilation member) described in Patent Document 1 is covered with a filter member (ventilation body), a bottom portion opening of the substantial tubular body of which has ventilating properties, and the attachment part (top opening part) of the substantial tubular body is fittingly inserted into the attachment opening formed in a neck portion of the device housing; thereby the ventilation cap is attached to the device housing.

CITATION LIST

Patent Literature

Patent Document 1: Japanese Patent Application Laid-Open Publication No. 2001-143524

SUMMARY OF INVENTION

Technical Problem

When a supporting body of substantially a tubular shape supporting a ventilation body (a filter member having ventilating properties) is manufactured by filling a mold with a thermoplastic material or a thermosetting material (hereinafter, sometimes simply referred to as "thermoplastic material, etc."), it is considered that the thermoplastic material, etc. is injected from a gate provided at a location corresponding to a side surface of the supporting body in substantially a tubular shape. Injection of the thermoplastic material, etc. from the gate provided at the location corresponding to the side surface of the supporting body causes a possibility that the thermoplastic material, etc. is separated at the injection location and then merged at a location of the supporting body opposite to the location where the gate is provided. When flows of the thermoplastic material, etc. are merged at the location opposite to the location where the gate is provided, there is a possibility that, at the merging portion, a welding line is generated in the centerline direction of the supporting body in substantially a tubular shape. Then, the supporting body in substantially a tubular shape is fitted (press-fitted) over a convex portion provided in the housing in a close-fit state for a long time, there is a possibility that the support body is broken along the welding line, to thereby cause a rupture.

An object of the present invention is to provide a method for manufacturing a supporting body with improved durability.

Solution to Problem

The present invention completed under such an object provides a method for manufacturing a supporting body (20) by filling a mold (51, 52) with a thermoplastic material or a thermosetting material, the supporting body (20) including a tubular-shaped tubular part (21) and a coupling part (23) coupling one portion and another portion of an inner surface (21c) of the tubular part (21) to support a ventilation body (10), the method including injecting the thermoplastic material or the thermosetting material into the mold (51, 52) from a gate (53) provided to the coupling part (23) and filling the mold (51, 52) with the thermoplastic material or the thermosetting material from the coupling part (23) toward the tubular part (21).

Here, the gate (53) may be provided at a center of the coupling part (23).

Moreover, the coupling part (23) may be formed in a direction orthogonal to a centerline direction of the tubular part (21).

Moreover, the coupling part (23) may extend from a portion as a center where the gate (53) is provided in plural directions toward the inner surface (21c) of the tubular part (21) and may join with the inner surface (21c).

Moreover, portions (232) where the coupling part (23) extending in the plural directions joins with the inner surface (21c) may be provided in a circumferential direction at regular intervals.

Moreover, the tubular part (21) may be fitted over a convex portion (110) provided on a housing (100) in a close-fit state, the housing (100) performing ventilation by the ventilation body (10).

Moreover, a thickness of the tubular part (21) may be 0.5 mm to 3.0 mm.

Moreover, a distance between junction points (233) of the coupling part (23) and the inner surface (21c) of the tubular part (21), the distance being a longest distance (L233) along a shape of the inner surface (21c) of the tubular part (21), may be shorter than a longest distance (L21b) from each of the junction points (233) to an end portion (21b) in a centerline direction of the tubular part (21), the end portion (21b) being on a side where the coupling part (23) is not provided.

Note that the above signs in this section are provided for exemplification in describing the present invention, and the present invention is not restricted by these signs.

Advantageous Effects of Invention

According to the present invention, it is possible to provide a method for manufacturing a supporting body with improved durability.

DESCRIPTION OF EMBODIMENT

Hereinafter, an exemplary embodiment according to the present invention will be described in detail with reference to attached drawings.

Figure 1:
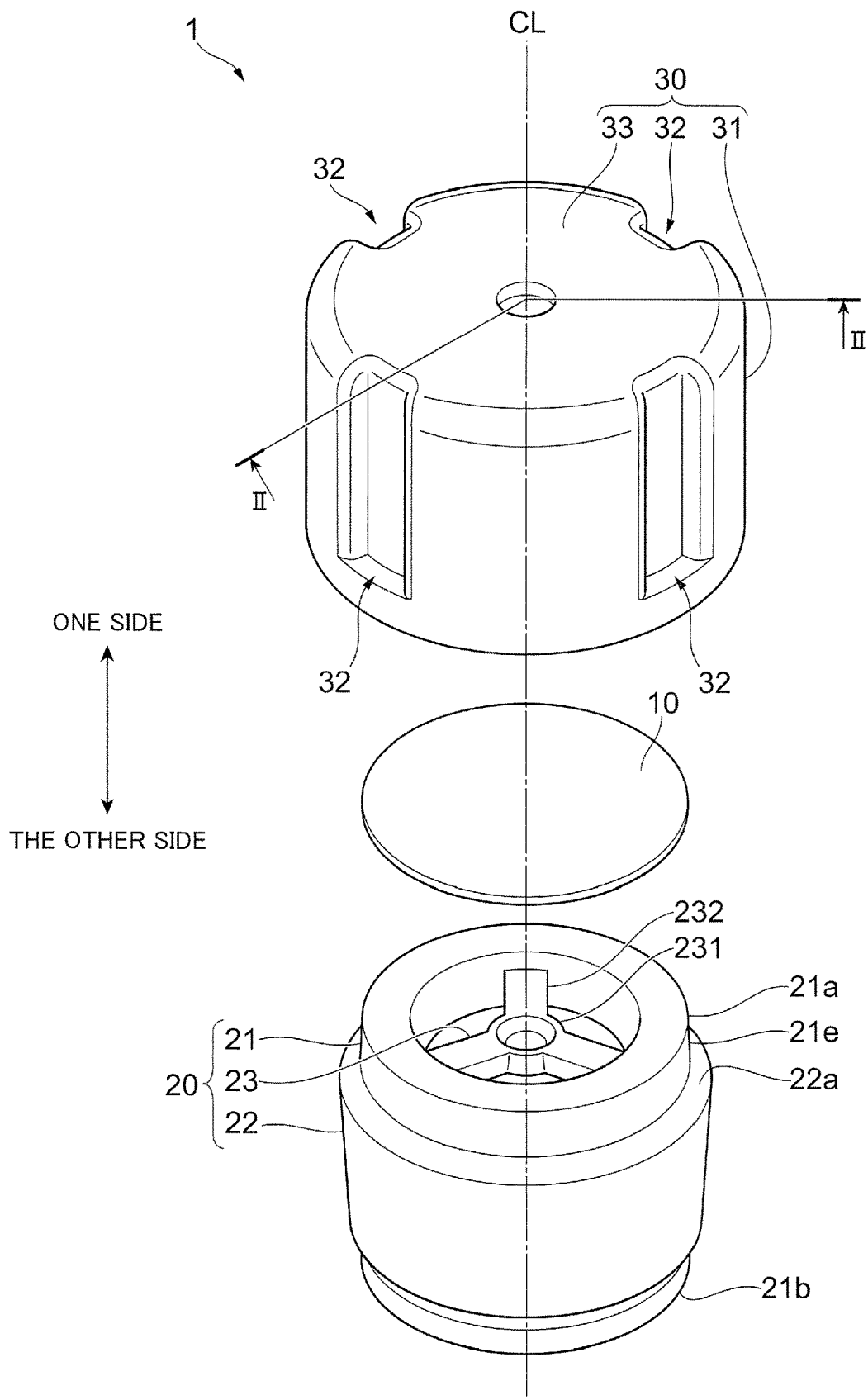
FIG. 1 is a diagram showing a general configuration of a ventilation member related to an exemplary embodiment.

FIG. 1 is a diagram showing a general configuration of a ventilation member 1 related to the exemplary embodiment.

Figure 2:
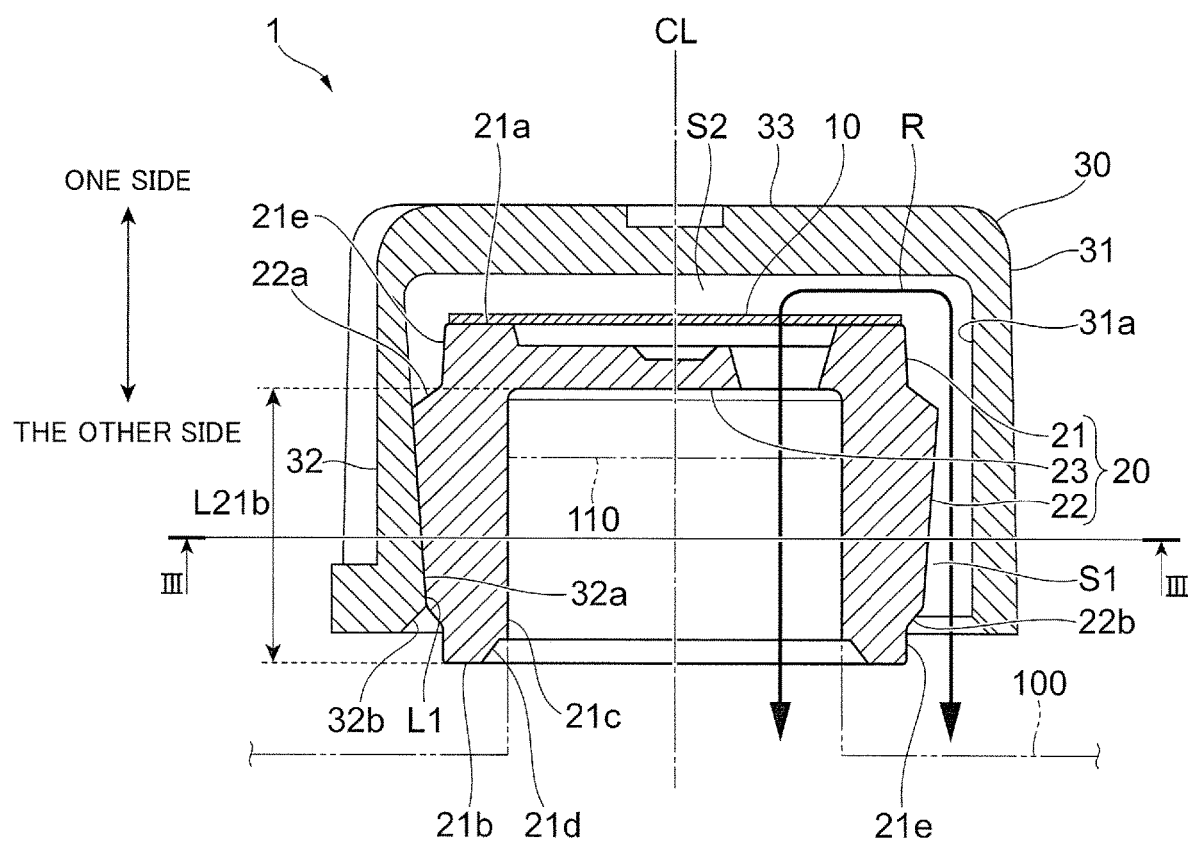
FIG. 2 is a cross-sectional view of the ventilation member related to the exemplary embodiment, which is a cross-sectional view of the II-II portion in FIG. 1.

FIG. 2 is a cross-sectional view of the ventilation member 1 related to the exemplary embodiment, which is a cross-sectional view of the II-II portion in FIG. 1.

Figure 3:
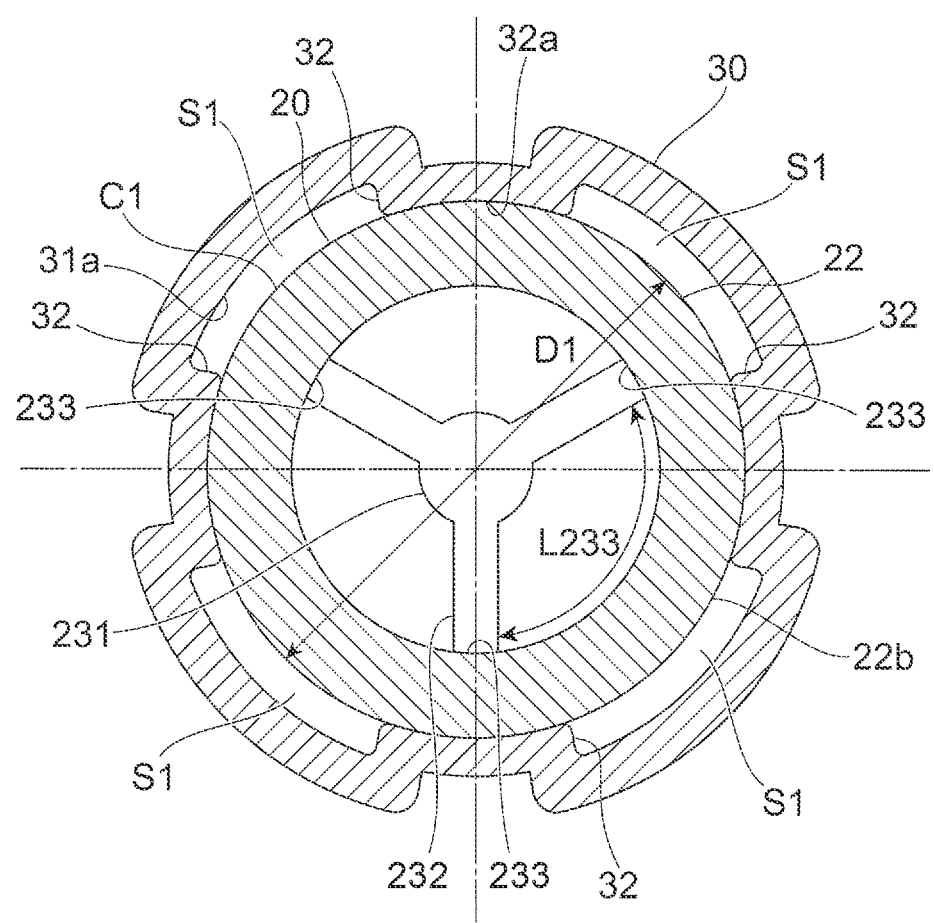
FIG. 3 is a cross-sectional view of the III-III portion in FIG. 2.

FIG. 3 is a cross-sectional view of the III-III portion in FIG. 2.

The ventilation member 1 is attached to a device housing 100 of each of devices including vehicle lamps, such as head lamps, rear lamps, fog lamps and turn lamps, an inverter, a converter, an ECU (Electronic Control Unit) a battery box and the like. FIG. 2 shows an attached part 110 by a chain double-dashed line, the attached part 110 being a portion formed in the device housing 100 for attaching the ventilation member 1 with an opened end portion.

The ventilation member 1 includes a ventilation membrane 10 as an example of a ventilation body having holes formed therein that prevent fluid and solids from penetrating into the inside of the device housing 100 from the outside of the device housing 100 and permit flow of gas between the inside of the device housing 100 and the outside of the device housing 100.

Moreover, the ventilation member 1 includes: a support member 20 as an example of a supporting body that supports the ventilation membrane 10; and a covering member 30 that covers surroundings of the ventilation membrane 10.

<<Ventilation membrane 10>>

The ventilation membrane 10 is formed into a disk shape. The outer diameter of the ventilation membrane 10 is larger than the diameter of an inner circumferential surface 21c, which will be described later, of the support member 20 and smaller than the diameter of an inner circumferential surface 31a of a side wall part 31, which will be described later, of a covering member 30.

The structure or material of the ventilation membrane 10 is not particularly limited as long as the ventilation membrane 10 allows passage of gas and prevents passage of a liquid. Examples of the ventilation membrane 10 can include cloth, resin or metal in a mesh shape or a fiber shape. For example, the ventilation membrane 10 can be a woven cloth, a non-woven cloth, a resin mesh, a net, a sponge, a porous metal body or a metal mesh.

The ventilation membrane 10 related to the exemplary embodiment includes a reinforcing layer laminated on a resin porous membrane for providing high strength to the ventilation membrane 10.

As the material of the resin porous membrane, examples can include a fluorine resin porous body or a polyolefine porous body that can be manufactured by a known stretching method or extraction method. As the fluorine resin, examples can include PTFE (polytetrafluoroethylene), polychlorotrifluoroethylene, tetrafluoroethylene-hexafluoropropylene copolymer and tetrafluoroethylene-ethylene copolymer. As monomers constituting polyolefine, examples can include: ethylene; propylene; 4-methylpentene-1; and 1-butene, and polyolefine obtained by homopolymerizing or copolymerizing these monomers can be used. Moreover, the material of the resin porous membrane may be obtained by blending at least two kinds of polyolefine, or may be a layer structure of at least two kinds of polyolefine.

Moreover, examples of the material of the resin porous membrane can include a nanofiber film porous body or the like using polyacrylonitrile, nylon or polylactic acid.

The ventilation membrane 10 related to the exemplary embodiment uses a PTFE porous membrane in view of the fact that a sufficient ventilation amount can be obtained even with a small area and high function of preventing water or dust from penetrating into the inside of the device housing 100 is provided.

Examples of the average pore diameter of pores formed in the ventilation membrane 10 can be within the range from 0.01 μm or more to 100 μm or less. Among the range, the average pore diameter is preferably in the range from 0.05 μm or more to 50 μm or less, and more preferably, in the range from 0.1 μm or more to 10 μm or less.

In the case where the average pore diameter formed in the ventilation membrane 10 is less than 0.01 μm, air is less likely to pass through the ventilation membrane 10. On the other hand, in the case where the average pore diameter of the ventilation membrane 10 exceeds 100 μm, fluid or solids are likely to penetrate into the inside of the device housing 100 through the ventilation membrane 10.

The thickness of the ventilation membrane 10 is not particularly limited; however, examples of the thickness can be within the range from 10 μm or more to 1000 μm or less.

When the thickness of the ventilation membrane 10 is excessively small, strength of the ventilation membrane 10 is likely to be reduced. On the other hand, when the thickness of the ventilation membrane 10 is excessively large, the size of the ventilation member 1 is likely to be increased.

On the surface of the ventilation membrane 10 (in particular, to an outside portion), liquid repellent treatment, such as water repellent treatment or oil repellent treatment may be applied. Application of the liquid repellent treatment to the ventilating film 10 suppresses adhesion of contamination or the like to the ventilation membrane 10. As a result, clogging of the ventilation membrane 10 is suppressed.

The liquid repellent treatment for the ventilation membrane 10 can be performed by coating the surface of the ventilation membrane 10 with a liquid repellent agent, which has, for example, a compound including a hydrocarbon group saturated with fluoride (perfluoro-alkyl group) in a side chain and has a main chain of acrylic series, methacrylic series, silicone series or the like as a component. The method of coating the surface of the ventilation membrane 10 is not particularly limited; for example, gravure coating, spray coating, kiss coating, dipping or the like can be adopted.

Moreover, as the oil repellent treatment, the method thereof is not particularly limited as long as oil repellent coating containing polymer having perfluoro-alkyl group can be formed. As the forming method, examples can include coating of solution or dispersion of polymer having perfluoro-alkyl group by an air spray method, an electrostatic spray method, a dip coating method, a spin coating method, a roll coating method, a curtain coating method, an impregnation method or the like, or coating formation method or the like by an electrodeposition coating method or a plasma polymerization method.

<<Support Member 20>>

The support member 20 includes: a cylindrical part 21 in a cylinder shape as an example of a tubular part; an outward protruding part 22 outwardly protruding from the cylindrical part 21; and a coupling part 23 coupling one portion and another portion in an inner surface of the cylindrical part 21.

The support member 20 supports the ventilation membrane 10 at one end portion 21a in the direction of the centerline CL (hereinafter, referred to as "centerline direction" in some cases) in the cylindrical part 21. The ventilation membrane 10 covers an opening at one side of the centerline direction in the cylindrical part 21. The method for fastening the ventilation membrane 10 to the cylindrical part 21 will be described in detail later. Moreover, the support member 20 is attached to the device housing 100 by fitting (press-fitting) the cylindrical part 21 over the attached part 110 of the device housing 100 in a close-fit state. In other words, by a contact pressure generated between an inner circumferential surface 21c of the cylindrical part 21 and the device housing 100, dropping off of the support member 20 from the attached part 110 of the device housing 100 can be suppressed. At the inside portion on the other end portion 21b side of the cylindrical part 21, a chamfer 21d is formed. By the chamfer 21d, the attached part 110 of the device housing 100 is inserted into the inside of the cylindrical part 21 with ease.

Examples of the thickness of the cylindrical part 21 can be 0.5 mm to 3.0 mm. More preferably, examples of the thickness of the cylindrical part 21 can be 2.0 mm or less. If it is possible to fit the support member 20 over the attached part 110 of the device housing 100 in the close-fit state to suppress dropping off by the contact pressure generated between the inner circumferential surface 21c and the device housing 100 and it is also possible to suppress the rupture, it is preferable that the thickness of the cylindrical part 21 is small. This is because the weight and size of the support member 20 can be reduced.

The outward protruding part 22 is substantially a cylinder-shaped portion outwardly projecting from an outer circumferential surface 21e of the cylindrical part 21, and an outer circumferential surface 22b thereof is gradually tilted inward (toward the centerline CL side) with a move from one side to the other side in the centerline direction. At a portion on the one side in the centerline direction of the outward protruding part 22, a chamfer 22a is formed. The chamfer 22a makes it easy to insert the support member 20 into the inside of the covering member 30.

Examples of the thickness of the outward protruding part 22 can be set so that the total thickness including the thickness of the cylindrical part 21 ranges from 1.0 mm to 3.5 mm. More preferably, examples of the total thickness including the thicknesses of the cylindrical part 21 and the outward protruding part 22 can be 2.0 mm or less.

The coupling part 23 includes: a columnar-shaped center part 231 provided on the centerline CL in the cylindrical part 21; and plate-like parts 232 in the plate shape extending from the center part 231 toward the inner circumferential surface 21c of the cylindrical part 21. The coupling part 23 related to the exemplary embodiment includes three plate-like parts 232 extending in three directions from the center part 231. The three plate-like parts 232 are formed at regular intervals (120-degree intervals) in the circumferential direction. Each plate-like part 232 is joined to the inner circumferential surface 21c of the cylindrical part 21. Hereinafter, a junction portion between the plate-like part 232 and the inner circumferential surface 21c of the cylindrical part 21 is referred to as "junction point 233" in some cases.

The coupling part 23 is provided at a position closer to one end portion 21a than the other end portion 21b in the centerline direction of the cylindrical part 21. Moreover, it can be illustrated, as an example, that the distance in the centerline direction between the ventilation membrane 10 supported by the one end portion 21a of the cylindrical part 21 and the coupling part 23 can be smaller than the radius of the inner circumferential surface 21c of the cylindrical part 21.

Note that the number of the plate-like parts 232 is not limited to three. It is preferable to set the number of the plate-like parts 232 while taking the following matters into account. It is set so that the distance L233 (refer to FIG. 3) between the junction points 233 in the cylindrical part 21 is shorter than the distance L21b (refer to FIG. 2) between the other end portion 21b, which is the end portion of the cylindrical part 21 having a larger distance in the centerline direction from the junction point 233, and the junction point 233. Moreover, it is preferable that the size of each plate-like part 232 in the circumferential direction be large taking fluidity of a material in performing injection molding into consideration; whereas, if the size is large, the ventilation area inside the cylindrical part 21 is reduced. In the support member 20 related to the exemplary embodiment, in view of the above matters, the number of the plate-like parts 232 is three.

It is preferable that the plural plate-like parts 232 be formed at regular intervals in the circumferential direction. For example, in the case where the number of the plate-like parts 232 is two, it is preferable that the two plate-like parts 232 be formed at 180-degree intervals. Alternatively, for example, in the case where the number of the plate-like parts 232 is four, it is preferable that the four plate-like parts 232 be formed at 90-degree intervals.

The material of the support member 20 is the thermoplastic material or the thermosetting material. As the thermoplastic material, examples include polybutylene terephthalate (PBT), polyphenylene sulfide (PPS), polysulfone (PS), polypropylene (PP), polyethylene (PE), ABS resin, thermoplastic elastomer, and a composite material thereof. Moreover, as the thermosetting material, examples include synthetic rubber, such as NBR (nitrile-butadiene rubber), EPDM (ethylene-propylene-diene-methylene (rubber)), silicone rubber, fluororubber, acrylic rubber and nitrile-butadiene rubber hydride, and a composite material thereof. Note that, as the material of the support member 20, other than the above-described thermoplastic material or thermosetting material, a composite material made by combining a reinforcement, such as glass fiber or carbon fiber, or metal with the thermoplastic material or thermosetting material to improve heat resistance, dimensional stability, rigidity or the like may be used.

The manufacturing method of the support member 20 will be described in detail later.

On the surface of the support member 20 (in particular, to an outside portion thereof), liquid repellent treatment, such as water repellent treatment or oil repellent treatment may be applied. By applying the liquid repellent treatment to the support member 20, adhesion of contamination or the like to the support member 20 is suppressed. As a result, clogging of the ventilation membrane 10 can be suppressed. It can be illustrated, as an example, that the liquid repellent treatment or oil repellent treatment for the support member 20 are the same as the above-described liquid repellent treatment or oil repellent treatment for the ventilation membrane 10.

As a method for fastening the ventilation membrane 10 to the support member 20, in the case where the support member 20 is made of the thermoplastic material, thermal welding, such as iron welding, ultrasonic welding or laser welding, is preferred. In addition, the ventilation membrane 10 may be fastened to the support member 20 by use of insert molding that injects resin in the state in which the ventilation membrane 10 is set to a mold.

<<Covering Member 30>>

The covering member 30 includes: a side wall part 31 having a cylindrical basic shape; an inward protruding part 32 inwardly protruding from an inner circumferential surface 31a of the side wall part 31; and disk-shaped top part 33 covering an opening portion on one side in the centerline direction in the side wall part 31 and the inward protruding part 32. In FIG. 2, the cross-sectional shape of the side wall part 31 and the top part 33 is depicted on the right side of the centerline CL, and the cross-sectional shape of the inward protruding part 32 and the top part 33 is depicted on the left side of the centerline CL.

The side wall part 31 is formed to generate a gap S1 between the inner circumferential surface 31a of the side wall part 31 and the outer circumferential surface 22b of the outward protruding part 22 of the support member 20.

As shown in FIG. 1, the plural (in the exemplary embodiment, four) inward protruding parts 32 are formed at regular intervals in the circumferential direction and formed at every predetermined angle in the circumferential direction.

In the case where the inward protruding parts 32 are cut with a plane orthogonal to the centerline CL, as shown in FIG. 3, inner surfaces 32a of the plural (four in the exemplary embodiment) inward protruding parts 32 are formed on substantially a same circle C1. Moreover, the inner surface 32a of the inward protruding part 32 is gradually tilted inward (toward the centerline CL side) with a move from one side to the other side in the centerline direction. More specifically, as shown in FIG. 2, in the case where the inward protruding part 23 is cut with a plane including the centerline CL, the straight line L1 depicting the inner surface 32a of the inward protruding part 32 is inclined with respect to the centerline CL, the distance between the straight line L1 and the centerline CL is reduced with a move from one side to the other side in the centerline direction. To put it another way, the diameter D1 of the above-described circle C1 is gradually reduced with a move from one side to the other side in the centerline direction.

Note that the diameter D1 of the circle C1 at one end portion in the centerline direction of the each of the plural inward protruding parts 32 is substantially the same as the outer diameter of the outer circumferential surface 22b of the outward protruding part 22 in the support member 20. Then, with a move from one side to the other side in the centerline direction, the diameter D1 of the circle C1 becomes smaller than the diameter of the outer circumferential surface 22b of the outward protruding part 22 in the support member 20.

Moreover, at a portion inside the end portion on the other side in the centerline direction of the inward protruding part 32, a chamfer 32b is formed. The chamfer 32b makes it easy to insert the support member 20 into the inside of the covering member 30.

In the ventilation member 1 configured as described above, as shown in FIG. 2, the covering member 30 and the support member 20 are assembled so that the inward protruding parts 32 of the covering member 30 are brought into contact with the outward protruding parts 22 of the support member 20. On that occasion, as shown in FIG. 2, the top part 33 is attached to form the gap S2 with the ventilation membrane 10.

Then, as shown in FIGS. 2 and 3, in the state where the covering member 30 is attached to the support member 20, the gap 51 formed between the inner circumferential surface 31a of the side wall part 31 of the covering member 30 and the outer circumferential surface 22b of the outward protruding parts 22 of the support member 20, the gap S2 formed between the top part 33 of the covering member 30 and the ventilation membrane 10, and the like function as a ventilation path R through which gases flow between the inside and the outside of the device housing 100.

The vehicle lamps, such as head lamps, rear lamps, fog lamps and turn lamps provided with the ventilation member 1 configured as described above and a closed device housing 100 containing an LED (Light Emitting Diode) as an example of a light source emitting light will be considered.

An LED contained in the device housing 100 of a lamp generates heat to get high temperature when being lighted. Therefore, when the LED is lighted, the air in an internal space of the device housing 100 of the lamp is warmed and expanded. On the other hand, when the LED is lighted down, heat generation in the LED is stopped; accordingly, the warmed air in the internal space of the device housing 100 is cooled and contracted. As described above, in the case where the air in the internal space of the device housing 100 is expanded to increase the pressure in the internal space or the air in the internal space is contracted to decrease the pressure in the internal space, gases flow through the ventilation path R of the ventilation member 1 from the internal space of the device housing 100 toward the outside of the lamp, or, from the outside of the lamp toward the internal space of the device housing 100. As a result, it is possible to suppress breakage of the device housing 100 and the like due to sudden increase of the pressure in the internal space of the device housing 100 or sudden decrease of the pressure in the internal space.

As described above, the ventilation member 1 related to the exemplary embodiment is provided with: the ventilation membrane 10 preventing penetration of fluid and solids and permitting penetration of gases; and the support member 20 supporting the ventilation membrane 10. The support member 20 includes the cylindrical part 21 that is in the tubular shape and, at one end portion 21a in the centerline direction, supports the ventilation membrane 10 to cover the opening portion on the one end portion 21a side, and inside the cylindrical part 21, the attached part 110 as an example of the convex portion provided to the device housing 100 as an example of the housing performing ventilation by the ventilation membrane 10 is inserted. In addition, the support member 20 includes the coupling part 23 coupling one portion and another portion in the inner circumferential surface 21a as an example of the inner surface of the cylindrical part 21.

Moreover, the coupling part 23 of the support member 20 is provided at a position closer to one end portion 21a than the other end portion 21b of the cylindrical part 21. With the configuration, as compared to the configuration in which the coupling part 23 is provided at a position closer to the other end portion 21b than the one end portion 21a of the cylindrical part 21, it is possible to increase the contact area between the inner circumferential surface 21c of the cylindrical part 21 and the attached part 110 of the device housing 100. Therefore, the ventilation member 1 related to the exemplary embodiment is less likely to drop off from (hardly comes out of) the attached part 110 of the device housing 100 as compared to the configuration in which the coupling part 23 is provided at a position closer to the other end portion 21*b* than the one end portion 21*a*.

Moreover, the distance in the centerline direction between the ventilation membrane 10 supported by the one end portion 21*a* of the cylindrical part 21 and the coupling part 23 is smaller than the radius of the inner circumferential surface 21*c* of the cylindrical part 21. With this configuration, the coupling part 23 suppresses deformation of the ventilation membrane 10. In other words, even though the center part of the ventilation membrane 10 is bent toward the inside of the device housing 100 due to decrease of the pressure in the internal space of the device housing 100, the coupling part 23 prevents the center part of the ventilation membrane 10 from bending too much. Consequently, the noise caused by bending of the ventilation membrane 10 is suppressed.

Moreover, when the center part of the ventilation membrane 10 is bent toward the inside of the device housing 100, water droplets and the like are likely to stay at the bent portion. If the water droplets and the like stay on the ventilation membrane 10, the ventilation area of the ventilation path R is reduced, and thereby it becomes difficult to adjust the pressure in the internal space of the device housing 100. According to the ventilation member 1 related to the exemplary embodiment, the coupling part 23 prevents the center part of the ventilation membrane 10 from bending too much; therefore, the water droplets and the like are less likely to stay on the ventilation membrane 10. Consequently, it is possible to suppress difficulty in adjusting the pressure in the internal space of the device housing 100 caused by the water droplets and the like staying on the ventilation membrane 10.

<<Method for Manufacturing Support Member 20>>

Next, a method for manufacturing the support member 20 will be described.

Figure 4:
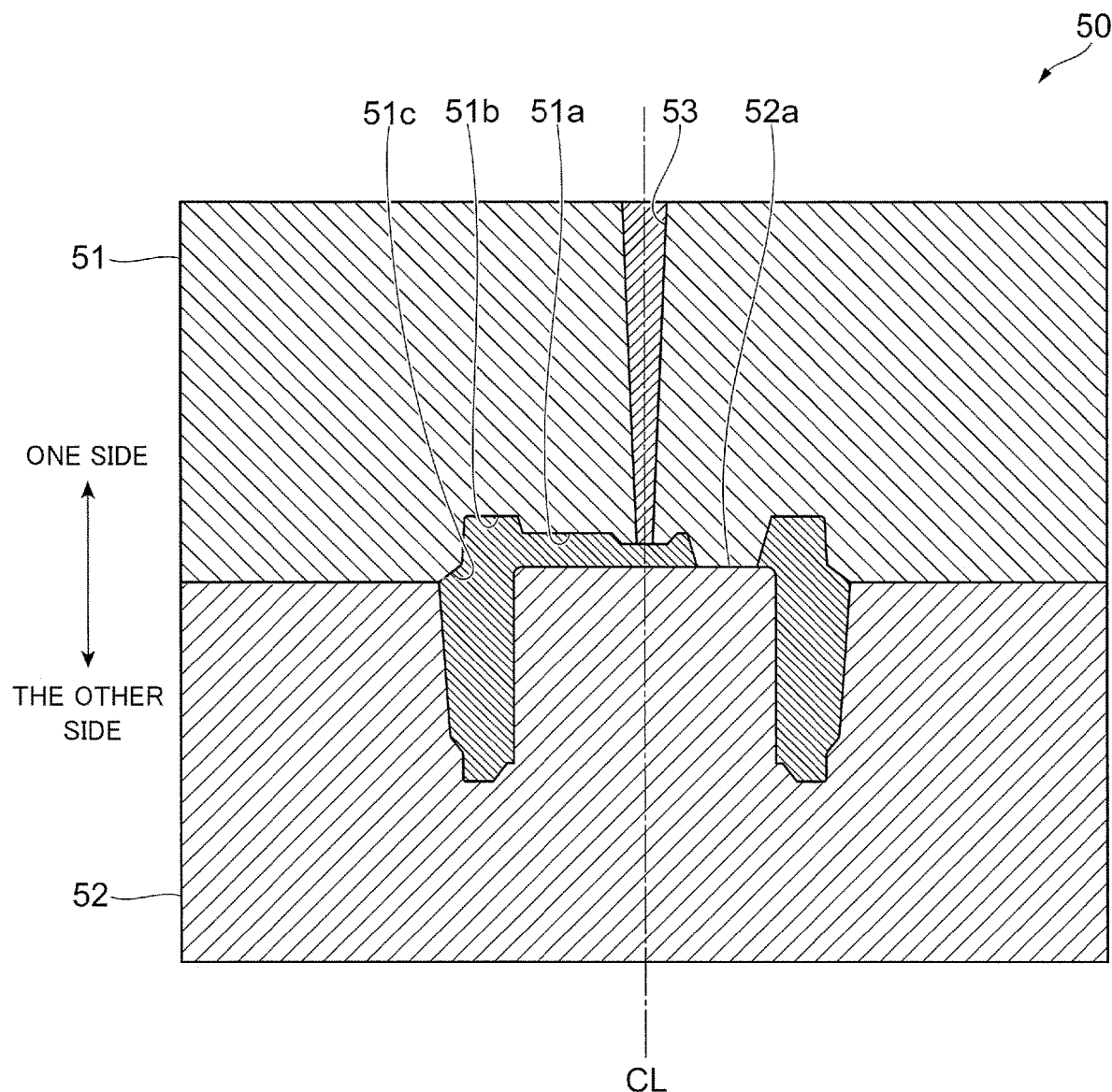
FIG. 4 is a schematic cross-sectional view of a manufacturing device used for manufacturing the support member.

FIG. 4 is a schematic cross-sectional view of a manufacturing device 50 used for manufacturing the support member 20.

The manufacturing device 50 performs injection molding, and manufactures the support member 20 by filling a mold with the thermoplastic material, etc.

The manufacturing device 50 is provided with: a fixed mold 51; a movable mold 52 moving with respect to the fixed mold 51; and a gate 53 provided to the fixed mold 51 for injecting the thermoplastic material, etc. The moving direction of the movable mold 52 is the same as the centerline direction. Note that, in FIG. 4, the gate 53 is formed at an upper portion of the support member 20; however, in the present invention, the gate 53 may be formed at a lower portion of the support member 20, in other words, inside the tubular-shaped part. Moreover, in FIG. 4, it is assumed that the mold forming the upper portion of the support member 20 is a fixed mold and the mold forming the lower portion of the support member 20 is a movable mold; however, it may be assumed that the mold forming the lower portion of the support member 20 is a fixed mold and the mold forming the upper portion of the support member 20 is a movable mold.

A joint portion of the fixed mold 51 and the movable mold 52 is configured as follows. On the outside of the support member 20, the portion is the end portion on the other side in the centerline direction at the chamfer 22*a* of the outward protruding part 22. On the inside of the support member 20, the portion is the end portion on the other side in the centerline direction in the coupling part 23. In other words, on the inside of the support member 20, an end surface 52*a* on the one side in the centerline direction in the movable mold 52 is a surface orthogonal to the centerline direction and is formed into a circular shape. On the other hand, in the fixed mold 51, on the end portion on the other side in the centerline direction, a concave portion 51*a* corresponding to the shape of the coupling part 23, a concave portion 51*b* corresponding to the shape of the end portion 21*a* on the one side of the cylindrical part 21, and a concave portion 51*c* corresponding to the shape of the chamfer 22*a* of the outward protruding part 22 are formed.

The gate 53 is provided on the centerline CL. An injection port of the gate 53 is formed to communicate with the concave portion 51*a* of the fixed mold 51.

The manufacturing device 50 configured as described above injects the thermoplastic material, etc. into a portion corresponding to the center part 231 of the coupling part 23. The injected thermoplastic material, etc. flows from the portion corresponding to the center part 231 of the coupling part 23 to portions corresponding to the plate-like parts 232. The coupling part 23 of the support member 20 related to the exemplary embodiment includes the three plate-like parts 232 at regular intervals in the circumferential direction; therefore, the injected thermoplastic material, etc. flows from the portion corresponding to the center part 231 of the coupling part 23 to the portions corresponding to the three plate-like parts 232. Then, the injected thermoplastic material, etc. flows from the portions corresponding to the plate-like parts 232 and reaches the junction portions (portions corresponding to the junction points 233) with the inner circumferential surface 21*c* of the cylindrical part 21, to thereby flow to the portions corresponding to the cylindrical part 21. The thermoplastic material, etc. having reached the junction portions between the coupling part 23 and the cylindrical part 21 reaches, in the centerline direction, the portion corresponding to the end portion 21*a* on one side and the portion corresponding to the end portion 21*b* on the other side in the cylindrical part 21. Moreover, the thermoplastic material, etc. having reached the junction portions between the coupling part 23 and the cylindrical part 21 reaches, in the radial direction, the portion corresponding to the outward protruding part 22. Thus, in the manufacturing device 50 related to the exemplary embodiment, the thermoplastic material, etc. is injected from the gate 53 provided to the coupling part 23 to charge the thermoplastic material, etc. from the coupling part 23 toward the cylindrical part 21 and the outward protruding part 22.

A method of manufacturing the support member 20 by use of the manufacturing device 50 configured as described above manufactures the support member 20 including the tubular cylindrical part 21 and the coupling part 23 coupling one portion and another portion of the inner circumferential surface 21*c* in the cylindrical part 21 to thereby support the ventilation membrane 10 by filling a mold including the fixed mold 51 and the movable mold 52 with the thermoplastic material, etc. Then, the method for manufacturing the support member 20 injects the thermoplastic material, etc. from the gate 53 provided to the coupling part 23 to charge the thermoplastic material, etc. from the coupling part 23 toward the cylindrical part 21.

Hereinafter, advantages of manufacturing by the manufacturing method related to the exemplary embodiment will be described as compared to the case of manufacturing by another manufacturing method. Note that, description will be given by taking the thermoplastic material as an example; however, the thermosetting material can provide the effects of the present invention by a similar mechanism though there are differences in the curing method.

As a support member related to a comparative example (hereinafter, referred to as "comparative member" in some cases) manufactured by a manufacturing method related to the comparative example, a member different from the support member 20 related to the exemplary embodiment in the point of not including a portion corresponding to the coupling part 23 will be considered. For example, the comparative member is a tubular-shaped member constituted by a portion corresponding to the cylindrical part 21 and a portion corresponding to the outward protruding part 22 of the support member 20 related to the exemplary embodiment. Then, in the manufacturing method related to the comparative example, the thermoplastic material is injected from a gate provided for injecting the thermoplastic material into a portion corresponding to an outer circumferential surface (a side surface) of the tubular-shaped member. Moreover, the position of the gate in the centerline direction in the manufacturing method related to the comparative example is the center part. Therefore, when the comparative member that is the tubular-shaped member is manufactured by the manufacturing method related to the comparative example, the thermoplastic material injected from the gate is separated and merged again after circulating in the mold for molding the tubular-shaped inner side. As a result, it takes the longest time to reach the portion opposite to the portion where the gate is provided, where the flows of the thermoplastic material are merged. Then, since the flows of the thermoplastic material are merged when the temperature thereof is decreased at the portion opposite to the portion where the gate is provided, there is a possibility that the welding line in the centerline direction extending from one end portion to the other end portion in the centerline direction is generated.

In contrast thereto, the method for manufacturing the support member 20 related to the exemplary embodiment injects the thermoplastic material from the gate 53 provided to the coupling part 23 to charge the thermoplastic material from the coupling part 23 toward the cylindrical part 21. According to the manufacturing method, the thermoplastic material separated at one of the junction points 233 between the plate-like parts 232 of the coupling part 23 and the inner circumferential surface 21c of the cylindrical part 21 is merged with the thermoplastic material separated at the other junction points 233. The time from being injected at the gate 53 to being merged is shorter than the time in the manufacturing method related to the comparative example. Therefore, the temperature of the thermoplastic material at the merging portion is higher than the temperature of the thermoplastic material at the merging portion in the manufacturing method related to the comparative example.

Moreover, as described above, the distance L233 between the junction points 233 in the cylindrical part 21 of the support member 20 is set shorter than the distance L21b between the junction point 233 and the other end portion 21b of the cylindrical part 21. In the case where the thermoplastic material separated at one of the junction points 233 and the thermoplastic material separated at another one of the junction points 233 are merged at an intermediate position of the one of the junction points 233 and the another one of the junction points 233, the flows of the thermoplastic material are merged within time less than half of the time in which the thermoplastic material reaches the other end portion 21b. Therefore, according to the method for manufacturing the support member 20 related to the exemplary embodiment, it becomes possible to merge the thermoplastic material separated at one of the junction points 233 and the thermoplastic material separated at another one of the junction points 233 before reaching a portion corresponding to the other end portion 21b, to thereby charge the thermoplastic material after being merged to the portion corresponding to the other end portion 21b.

From above, according to the method for manufacturing the support member 20 related to the exemplary embodiment, it becomes possible to cause the welding line in the centerline direction extending from one end portion 21a to the other end portion 21b in the cylindrical part 21 less likely to be generated.

As described above, the ventilation member 1 is attached to the device housing 100 by fitting (press-fitting) the cylindrical part 21 of the support member 20 over the attached part 110 of the device housing 100 in a close-fit state. Then, the ventilation member 1 is used for a long period of time in the state in which the support member 20 is fitted (press-fitted) over the device housing 100 in the close-fit state. In other words, the support member 20 is used for a long period of time in the state in which the tensile stress is generated in the cylindrical part 21 and the outward protruding part 22. On the other hand, the portion where the welding line is generated is lower in the strength than the portion where the welding line is not generated. Therefore, in the case where the welding line in the centerline direction extending from one end portion 21a to the other end portion 21b in the centerline direction is generated, breakage and rupture are likely to occur than the case where the welding line is not generated or the case where the welding line is generated only in a part of the centerline direction.

From above, the support member 20 manufactured by the method for manufacturing the support member 20 related to the exemplary embodiment is less likely to be broken as compared to the comparative member manufactured by the manufacturing method related to the comparative example. Consequently, use of the method for manufacturing the support member 20 related to the exemplary embodiment makes it possible to improve durability of the support member 20.

Moreover, the support member 20 manufactured by use of the manufacturing method related to the exemplary embodiment has higher strength than the comparative member manufactured by the manufacturing method related to the comparative example; therefore, it becomes possible to make the thickness of the support member 20 manufactured by use of the manufacturing method related to the exemplary embodiment smaller than the thickness of the comparative member. Accordingly, use of the manufacturing method related to the exemplary embodiment makes it possible to perform downsizing and weight reduction of the support member 20.

In the above-described manufacturing device 50, the gate 53 is provided at the center of the coupling part 23. Consequently, the thermoplastic material injected from the gate 53 reaches one portion in the inner circumferential surface 21c of the cylindrical part 21 (one junction point 233 among the plural junction points 233) and another portion (another junction point 233 among the plural junction points 233) at the similar timing. Therefore, also in the cylindrical part 21 and the outward protruding part 22, it is possible to form the merging portions uniformly in the circumferential direction. Moreover, the thermoplastic material separated into one plate-like part 232 and the thermoplastic material separated into another plate-like part 232 are less likely to be merged at the plate-like part. Thus, the thickness of the plate-like part 232 can be reduced.

Moreover, it is preferable that the coupling part 23 is formed in a direction orthogonal to the centerline direction of the cylindrical part 21. In the case where the configuration in which the movable mold 51 moves in the centerline direction of the cylindrical part 21 with respect to the fixed mold 51 and the centerline direction of the cylindrical part 21 is set in the vertical direction, the plate-like parts 232 of the coupling part 23 extend in the horizontal direction. Consequently, the thermoplastic material injected from the gate 53 is likely to reach one portion in the inner circumferential surface 21c and another portion of the cylindrical part 21 at the similar timing. Therefore, also in the cylindrical part 21 and the outward protruding part 22, it is possible to form the merging portions uniformly in the circumferential direction. Moreover, the thermoplastic material separated into one plate-like part 232 and the thermoplastic material separated into another plate-like part 232 are less likely to be merged at the plate-like part. Thus, the thickness of the plate-like part 232 can be reduced.

Moreover, the coupling part 23 extends around the portion where the gate 53 is provided toward the inner circumferential surface 21c of the cylindrical part 23 in at least three directions to join with the inner circumferential surface 21c. Consequently, it is possible to merge the thermoplastic material separated at one of the junction points 233 and the thermoplastic material separated at another one of the junction points 233 earlier, and to suppress reduction of the ventilation area inside the cylindrical part 21 due to improvement in fluidity of the thermoplastic material and provision of the coupling part 23.

[Experimental Results]

Figure 5:
FIG. 5 is a diagram showing experimental results.
Figure 5:
Figure 5:
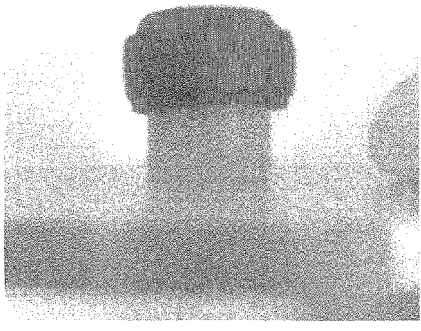
Figure 5:
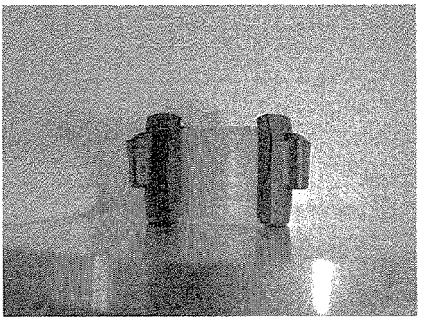

FIG. 5 is a diagram showing experimental results.

The member related to an experimental example (hereinafter, referred to as "experimental member" in some cases) is the support member 20 manufactured by the method for manufacturing the support member 20 related to the exemplary embodiment. As the material, olefin-based thermoplastic elastomer (MILASTOMER manufactured by Mitsui Chemicals, Inc.) was used. Of the experimental member, the outermost diameter (corresponding to the diameter of the outer circumferential surface of the outward protruding part 22) was 12.0 mm, the inner diameter (corresponding to the inner diameter of the inner circumferential surface 21c) was 7.5 mm, the basic thickness (for example, corresponding to the thickness of the cylindrical part 21) was 1.5 mm and the height (size in the centerline direction) was 8.0 mm. The cross-sectional area in the case where the experimental member was cut with a plane including the centerline was about 30 mm$^2$. The experimental member was fitted (press-fitted) over a member made of aluminum (corresponding to the attached part 110) having the outer diameter of 9.5 mm and the height of 10 mm. Thereafter, the experimental member was loaded into a furnace heated to 105° C., and changes in appearance of the experimental member (whether the member was broken or not) were confirmed 100 hours after and 200 hours after.

The member related to the comparative experimental example (hereinafter, referred to as "comparative experimental member" in some cases) is basically a cylinder-shaped member and has four protruding parts in the circumferential direction at regular intervals, the protruding parts protruding outwardly from the outer circumferential surface. The material same as that of the experimental member was used. Of the comparative experimental member, the outermost diameter (the diameter of the outer circumferential surface of the above-described protruding part) was 16 mm, the inner diameter was 7.5 mm, the basic thickness was 2 mm and the height was 12 mm. The cross-sectional area in the case where the comparative experimental member was cut with a plane including the centerline was about 76 mm$^2$ in the portion where the above-described protruding part existed, and was about 54 mm$^2$ in the portion where the above-described protruding part did not exist. The comparative experimental member was fitted (press-fitted) over a member made of aluminum (corresponding to the attached part 110) having the outer diameter of 9.5 mm and the height of 10 mm. Thereafter, the experimental member was loaded into a furnace heated to 105° C., and changes in appearance of the comparative experimental member (whether the member was broken or not) were confirmed 100 hours after and 200 hours after.

The experimental results were as shown in FIG. 5; when confirmation was made 200 hours after, whereas the comparative experimental member was broken and rupture was generated, it was confirmed that the experimental member was not broken even after a laps of 200 hours. In the comparative experimental member, the rupture was generated at the location where the welding line was generated from one end portion to the other end portion in the centerline direction. In the comparative experimental member, the cross-sectional area of the portion where the rupture was generated is about 27 mm$^2$ (which is the half of the cross-sectional area of 54 mm$^2$ in the case where the portion in which the above-described protruding part did not exist was cut with a plane including the centerline). In contrast thereto, in the experimental member, the half (the cross-sectional area of the portion where the rupture was not generated) of the cross-sectional area in the case where the experimental member was cut with a plane including the centerline (about 30 mm$^2$) is about 15 mm$^2$. It can be assumed that the reason why, as described above, the rupture was generated in the comparative experimental member despite that the cross-sectional area of the portion of the comparative experimental member where the rupture was generated was larger than the cross-sectional area of the portion of the experimental member where the rupture was not generated was that the welding line was generated.

By the experimental results, it was able to confirm that use of the method for manufacturing the support member 20 related to the exemplary embodiment made it possible to improve durability of the support member 20.

REFERENCE SIGNS LIST

1 Ventilation member
10 Ventilation membrane
20 Support member
21 Cylindrical part
22 Outward protruding part
23 Coupling part
30 Covering member
31 Side wall part
32 Inward protruding part
33 Top part
100 Device housing
110 Attached part

The invention claimed is:

1. A method for manufacturing a supporting body by filling a mold with a thermoplastic material or a thermosetting material, the supporting body being configured to support a ventilation body and including (i) a tubular part and (ii) a coupling part coupling one portion and another portion of an inner surface of the tubular part, the coupling part being configured to allow gas that passes through the ventilation body to pass through the supporting body, the method comprising:

injecting the thermoplastic material or the thermosetting material into the mold from a gate provided to the coupling part and filling the mold with the thermoplastic material or the thermosetting material from the coupling part toward the tubular part.

2. The method for manufacturing a supporting body according to claim 1, wherein the gate is provided at a center of the coupling part.

3. The method for manufacturing a supporting body according to claim 1, wherein the coupling part is formed in a direction orthogonal to a centerline direction of the tubular part.

4. The method for manufacturing a supporting body according to claim 1, wherein the coupling part extends from a portion at a center where the gate is provided in a plurality of directions toward the inner surface of the tubular part to join with the inner surface.

5. The method for manufacturing a supporting body according to claim 4, wherein portions where the coupling part extending in the plurality of directions joins with the inner surface are provided in a circumferential direction at regular intervals.

6. The method for manufacturing a supporting body according to claim 1, wherein the tubular part is fitted over a convex portion provided on a housing in a close-fit state, the housing performing ventilation by the ventilation body.

7. The method for manufacturing a supporting body according to claim 1, wherein a thickness of the tubular part is 0.5 mm to 3.0 mm.

8. The method for manufacturing a supporting body according to claim 1, wherein a distance between junction points of the coupling part and the inner surface of the tubular part, the distance being a longest distance along a shape of the inner surface of the tubular part, is shorter than a longest distance from each of the junction points to an end portion in a centerline direction of the tubular part, the end portion being on an end where the coupling part is not provided.

* * * * *